United States Patent [19]

Hollander et al.

[11] Patent Number: 4,808,241

[45] Date of Patent: Feb. 28, 1989

[54] RAPID RESPONSE THERMOCOUPLE PROBE HAVING REPLACEABLE THERMOCOUPLE ELEMENT

[75] Inventors: Milton B. Hollander; William E. McKinley, both of Stamford, Conn.

[73] Assignee: Omega Engineering, Inc., Stamford, Conn.

[21] Appl. No.: 3,189

[22] Filed: Jan. 14, 1987

[51] Int. Cl.[4] .................................. H01L 35/02
[52] U.S. Cl. ........................ 136/230; 136/225; 136/235; 374/179
[58] Field of Search ............... 136/221, 224, 225, 230, 136/235, 226, 231, 232, 290; 374/179; 29/573; 339/176 T, 196 R, 196 A, 196 M, 206 R, 206 P, 63 R, 63 M

[56] References Cited

U.S. PATENT DOCUMENTS

| | | |
|---|---|---|
| 811,819 | 2/1906 | Bristol .................. 136/230 X |
| 1,979,085 | 10/1934 | Vollrath ..................... 136/235 |
| 2,422,124 | 6/1947 | Obermaier .................. 136/221 |
| 2,611,791 | 9/1952 | Brandau .................... 136/235 |
| 2,849,518 | 8/1958 | MacDonald .................. 136/235 |
| 2,994,733 | 8/1961 | Scadron .................. 136/235 X |
| 3,283,580 | 11/1966 | Nanigian et al. ........... 136/221 X |
| 3,390,578 | 7/1968 | Moore .................... 374/179 X |
| 3,395,050 | 7/1968 | Senbokuya ................. 136/221 |
| 3,416,973 | 12/1968 | Benzinger ................. 136/235 |
| 4,162,929 | 7/1979 | Finney ..................... 136/232 |
| 4,279,154 | 7/1981 | Nakamura ................. 136/221 X |
| 4,552,465 | 11/1985 | Anderson ................. 136/230 X |
| 4,595,020 | 6/1986 | Palti .................... 374/179 X |

FOREIGN PATENT DOCUMENTS

| | | | |
|---|---|---|---|
| 48383 | 4/1977 | Japan ..................... 136/230 |
| 942617 | 11/1963 | United Kingdom ............ 374/179 |
| 1022172 | 3/1966 | United Kingdom ............ 136/230 |

OTHER PUBLICATIONS

Wheelco Surface Temperature Pyrometer Brochure, Chicago, Illinois, 1940.
"Pyro Surface Pyrometer–catalog No. 169", The Pyrometer Instrument Co., Inc., Bergenfield, N.J., Feb. 66, pp. 1–8.

Primary Examiner—Brian S. Steinberger

[57] ABSTRACT

The present invention relates to a rapid response thermocouple probe 10 having a resilient, replaceable thermocouple element 50 probe 10, comprising cylindrical body 20 having housing means 30 at one end, securing means 40 associated with housing means 30 and comprising two securing elements, 40a and 40b, in electrical isolation from each other, and a resilient thermocouple element 50 comprising an arcuate strip of two dissimilar metals joined together, ends, 55 and 57, of thermocouple element 50 being removably secured to securing means 40. The thermocouple probe of this invention eliminates the necessity of discarding the entire probe upon wear or breakage of thermocouple element 50.

25 Claims, 2 Drawing Sheets

RAPID RESPONSE THERMOCOUPLE PROBE HAVING REPLACEABLE THERMOCOUPLE ELEMENT

TECHNICAL FIELD

This invention relates to a rapid response thermocouple probe having a replaceable thermocouple element. The thermocouple probe is used for the measurement of the temperature of a surface, especially a moving surface.

A thermocouple is the practical manifestation of the physical observation that when two wires composed of dissimilar metals are joined at both ends and one of the ends is heated, a continuous current flows in the resulting circuit. If this circuit is broken, the net open circuit voltage is a function of the junction temperature and the composition of the two metals. Using this principle, a thermocouple can be used to measure the temperature of a surface or composition when the junction of the thermocouple is placed in contact with the surface or composition and the nature of the metals used to form the thermocouple is known.

Thermocouples have been developed for being brought mechanically or by hand into contact with a surface. Unfortunately, repeated contact with a surface, particularly a moving surface, can cause the thermocouple element to wear excessively or even break. When this occurs, the thermocouple probe itself must be discarded and a new one used in its place. Attempts to make the element more durable most often result in slower response and increased manufacturing complexity.

BACKGROUND ART

Thermocouple probes useful for measuring the temperature of a surface are well known. Such devices are typically hand-held having a support on one end from which extends a suitable thermocouple element. Thermocouple probes are especially useful in measuring the temperature of a moving surface such as, for instance, a rotating fuser roll of an electrophotographic copying machine.

U.S. Pat. No. 3,395,050 to Senbokuya illustrates a prior art rapid response thermocouple probe. The reduced thickness of the element, necessary for rapid response, greatly reduces its durability. Accordingly, the thermocouple element, which is formed as an arcuate strip, is permanently mounted on a support and is formed as a unitary structure with the leads. This construction has several disadvantages. First, upon wear of the thermocouple element, the usefulness of the entire probe is destroyed and a new probe must be acquired. Secondly, the complexity of the manufacturing process is increased due to the need to assemble and weld the various parts forming the unitary structure.

U.S. Pat. No. 4,279,154 to Nakamura discloses a thermocouple probe having an arcuate thermocouple element, similar to that disclosed by Senbokuya, an element support means such as that disclosed by Senbokuya, and additionally a layer of a slippery, electrically insulated material disposed over the surface of the thermocouple element to prevent an ungrounded junction between the thermocouple element and the surface to be measured, and also to reduce wear of the thermocouple element. Although extending the life of the thermocouple element, the disclosure of this patent does not eliminate the problem that, once wear does occur, the entire thermocouple probe must be replaced, not just the thermocouple element. Moreover, it has other problems of the type noted above for Senbokuya.

U.S. Pat. No. 3,416,973 to Benzinger discloses a thermocouple apparatus in which the entire apparatus may be disconnected from the leads and discarded. The replaceability of the thermocouple element to eliminate the need to discard the entire apparatus is clearly not within the contemplation of Benzinger. Moreover, it is apparently too massive to provide rapid response.

U.S. Pat. No. 4,595,020 to Palti discloses a thermocouple probe whose usable life span is shorter than the time it takes to wear out or break the thermocouple element. This patent, therefore, does not address the problem of wear of a rapid response thermocouple element when the usable life of the thermocouple probe is desired to be longer than that of the element.

There remains a present need for a rapid response thermocouple probe having a simple, durable and replaceable thermocouple element, thus eliminating the need to discard the entire thermocouple probe upon wear or breakage of the element.

BRIEF DESCRIPTION OF THE DRAWINGS

The present invention will be better understood and its advantages more apparent in view of the following detailed description, especially when read with reference to the appended drawings, wherein.

DISCLOSURE OF INVENTION

The present invention is generally embodied in a thermocouple probe 10 for conducting temperature measurements on a surface, especially a moving surface. Probe 10 may be used on many different surfaces, including curved or flat, metal, plastic or ceramic, and the surface may be moving either linearly or angularly. The term "metal" as used herein refers to an opaque, fusible, ductile substance which is a good conductor of electricity and heat, including chemical elements, such as iron, copper, nickel, chromium, aluminum and alloys thereof. The term "plastic" as used herein refers to any organic synthetic or processed material which is mostly thermoplastic or thermosetting polymer of high molecular weight and which can be molded, cast, extruded, drawn or laminated into objects, films or filaments, such as polyethylene, polypropylene and polyimide.

Figure 1:
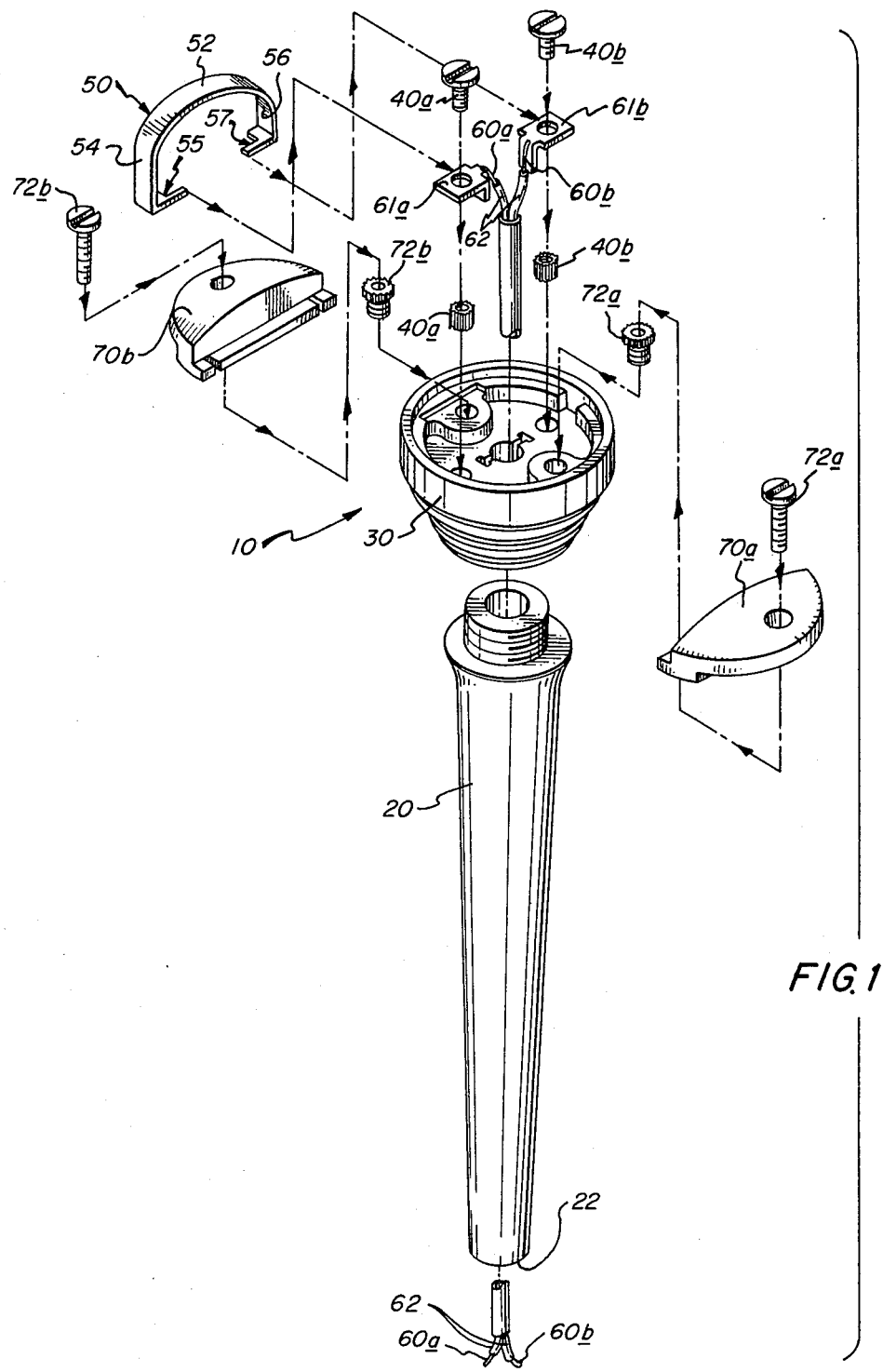
FIG. 1 is a partially exploded perspective view of the thermocouple probe of the present invention.

Referring particularly to FIG. 1, thermocouple probe 10 is generally comprised of cylindrical body 20 having housing means 30 at one end. Housing means 30 has securing means 40 associated with it. Securing means 40 comprises two securing elements, 40a and 40b, which are electrically isolated from each other. Probe 10 further comprises thermocouple element 50 comprising positive leg 54 and negative leg 56 which are joined at junction 52. The ends of legs 54 and 56 are each removably secured to securing elements 40a and 40b, respectively.

Advantageously, probe 10 further comprises leads, 60a and 60b, which are connected to securing elements 40a and 40b respectively, and which extend through cylindrical body 20 and exit at port 22 described further below. Additionally, probe 10 further comprises thermocouple element support means, 70a and 70b, which is operatively associated with thermocouple element 50 to reduce deformation of thermocouple element 50. Cylindrical body 20 is preferably a hollow tube-like structure comprised of any suitable, preferably rigid, material. Preferably, cylindrical body 20 is formed of metal, plastic, or a ceramic material, with plastic being more preferred. Most preferably, cylindrical body 20 is formed of a high density plastic such as high density polyethylene. If cylindrical body 20 is formed of metal, care must be taken to electrically isolate the metal of cylindrical body 20 from thermocouple element 50 and leads 60a and 60b.

Referring to FIG. 1, cylindrical body 20 has a port 22, preferably at an end thereof, to allow passage of leads 60a and 60b through cylindrical body 20 to a measuring device, as explained in more detail below. Port 22 is typically an opening in the end of cylindrical body 20 and may have other elements (not shown), such as a strain relief bushing or a grommet, associated with it as would be known to one skilled in the art.

Figure 2:
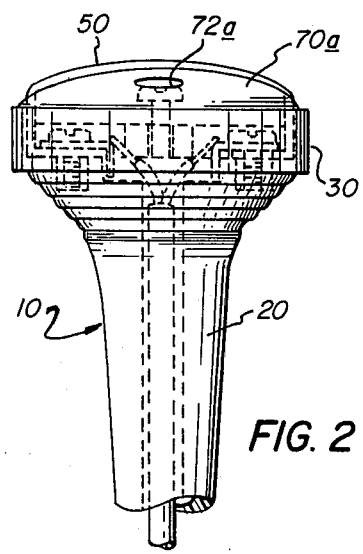
FIG. 2 is a side elevation view of the thermocouple probe of the present invention.
Figure 3:
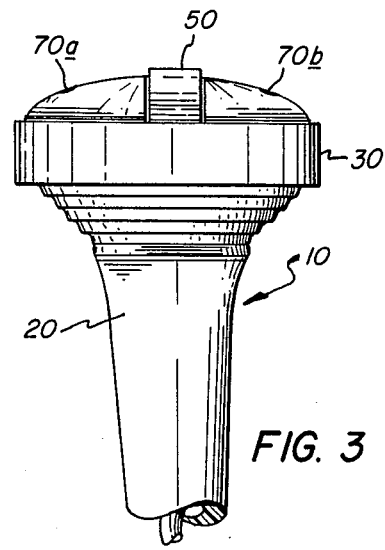
FIG. 3 is a side elevation view of the thermocouple probe of the present invention.
Figure 4:
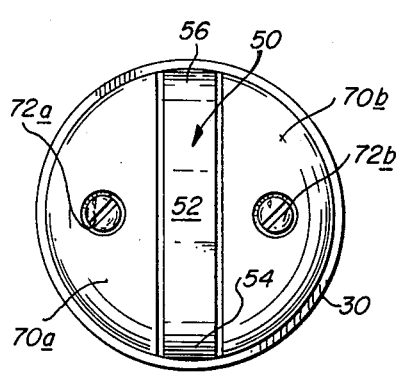
FIG. 4 is a top plan view of the present invention showing the upper surface of the thermocouple probe.
Figure 6:
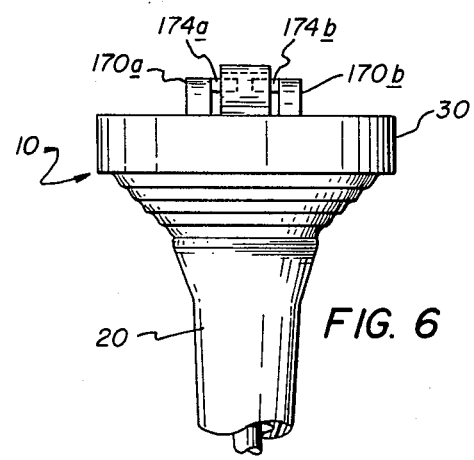
FIG. 6 is a side elevation view of an alternate embodiment of the thermocouple probe of the present invention.

Referring to FIGS. 1–3, cylindrical body 20 also has housing means 30 on an end thereof. Housing means 30 may be formed of metal or plastic, but is preferably formed of the same material as cylindrical body 20, i.e., high density polyethylene. Housing means 30 may be attached to cylindrical body 20 by conventional means such as by disposing threads on housing means 30 and the end of cylindrical body 20, allowing housing means 30 to be screwed onto cylindrical body 20, as illustrated in FIG. 1. Housing means 30 and cylindrical body 20 may also be formed as a single integral unit as illustrated in FIG. 6, such as by molding high density polyethylene into the appropriate form. Housing means 30 has securing means 40 associated with it. Securing means 40 is comprised of two securing elements, 40a and 40b, respectively, which are electrically isolated from each other in order to prevent positive and negative legs 54 and 56 from coming into contact with each other when legs 54 and 56 are secured to securing elements 40a and 40b. Securing elements 40a and 40b comprise any suitable means for removably securing element 50 to housing means 30. Typically, securing elements 40a and 40b each comprise a screw and a bushing recessed into housing means 30 either as a separate unit or integrally formed in housing means 30, as illustrated in FIG. 1. The skilled artisan will recognize that other means of removably securing thermocouple element 50 to securing means 40 may be useful herein.

Referring to FIG. 1, thermocouple element 50 is comprised of a metal positive leg 54 and a metal negative leg 56, wherein the metals are dissimilar, as is conventional in the art. Although positive leg 54 is consistently depicted as being on one particular side of thermocouple element 50 relative to negative leg 56, this is for convenience only. In practice, positive leg 54 and negative leg 56 can each be on either side relative to the other. Advantageously, positive leg 54 is comprised of copper, iron or a chromium-nickel alloy, commercially available as Chromel brand alloy from Hoskins Manufacturing Company of Hamburg, Mich. Negative leg 56 is advantageously comprised of an aluminum-nickel alloy, commercially available as Alumel brand alloy from Hoskins Manufacturing Company, or a copper-nickel alloy, commercially available as Constantan brand alloy from Hoskins Manufacturing Company. The thermocouple elements embodied in this invention are commonly referred to as types J, K, B, R, S, T, E, N or G, according to standard Instrument Society of America designations.

One end of each of positive and negative legs 54 and 56 of thermocouple element 50 are joined together to form junction 52, typically by welding. For example, legs 54 and 56 are welded together with the resulting bead dressed, such as by grinding, to a smooth, flat surface without burrs or bumps. Preferably, though, positive and negative legs 54 and 56 are joined together to form junction 52 by butt welding the two dissimilar metals together to form a thermocouple junction at the point of contact. Legs 54 and 56 may then be rolled to form a thinner, faster-responding junction. Care must be taken that positive and negative legs 54 and 56 do not come into contact with each other except at junction 52 to avoid formation of an additional metallic junction. The remaining ends, 55 and 57, respectively, of positive and negative legs 54 and 56 are adapted to be removably secured to securing elements 40a and 40b respectively. To facilitate this, ends 55 and 57 of thermocouple element 50 may be shaped as appropriate to be secured to securing elements 40a and 40b. For instance, where securing elements 40a and 40b comprise threaded screws, ends 55 and 57 may have slots, as illustrated in FIG. 1, to allow for engagement of the ends by the screws. Preferably, securing elements 40a and 40b are each comprised of the same metal as the respective end of positive leg 54 and negative leg 56 attached thereto in order to avoid creation of an additional metallic junction. For instance, if positive leg 54 is comprised of copper, then securing element 40a should also be comprised of copper. In the alternative, securing means 40 may be comprised of an inert, non-conductive material such as a plastic or rubber.

In an advantageous embodiment of this invention, ends 55 and 57 are polarized with respect to each other, by which is meant that they are configured so that each of ends 55 and 57 can be secured by only one of securing elements 40a and 40b. In this way, proper connection of thermocouple element 50 to securing means 40 is assured without the need for extra measures or efforts such as careful examination or marking of positive and negative legs 54 and 56 and securing elements 40a and 40b, yet while avoiding creation of additional metallic junctions. Of course, securing elements 40a and 40b must also be polarized so as to secure the proper one of ends 55 and 57.

Thermocouple element 50 is formed so as to comprise a resilient arcuate strip having positive leg 54 on one side, negative leg 56 on the other side, and junction 52 in the center, as illustrated in FIG. 1. Preferably, thermocouple element 50 is sufficiently thin to allow for rapid heat transfer from the surface whose temperature is to be measured to junction 52 to provide acceptably rapid response times. Advantageously, thermocouple element 50 is about 0.003 to about 0.020 inches thick, most preferably about 0.005 to about 0.010 inches thick to facilitate acceptably rapid response.

Thermocouple probe 10 preferably also comprises leads, 60a and 60b, which are connected to securing means 40a and 40b, respectively, so as to be in electrical contact with positive and negative legs 54 and 56, respectively, through ends 55 and 57. Typically, leads 60a and 60b are each provided with a suitable element to facilitate attachment to securing means 40a and 40b such as fittings 61a and 61b. Fittings 61a and 61b, as illustrated in FIG. 1, are conventional in the art and would be familiar to the skilled artisan Leads 60a and 60b extend from securing means 40 through cylindrical body 20 and exit through port 22 to a suitable device (not shown) for measuring, amplifying or recording the signals received from thermocouple element 50 through leads 60a and 60b, to detect the temperature at junction 52.

Leads 60a and 60b are most preferably comprised of the same metals which comprise positive and negative legs 54 and 56 respectively, in order to avoid creation of another metallic junction. For instance, if negative leg 56 is comprised of an aluminum-nickel alloy, lead 60b should also be comprised of the aluminum-nickel alloy. Moreover, with the exception of the portions of leads 60a and 60b in electrical contact with legs 54 and 56 respectively, leads 60a and 60b should preferably be covered by a suitable insulating material 62 for maintaining the integrity of the signal passing through leads 60a and 60b to the measuring device. Materials suitable for insulating material 62 are conventional and well known to one skilled in the art.

Probe 10 of this invention advantageously also comprises element support means 70. Support means 70 is preferably comprised of a pair of support elements, 70a and 70b, removably mounted on housing means 30 on either side of thermocouple element 50. Element support means 70 can be mounted on housing means 30 by any suitable means. For instance, a screw and bushing arrangement, 72a 72b, as illustrated in FIG. 1, can be used to secure element support means 70 to housing means 30. Most preferably, each of support elements 70a and 70b has a height from housing means 30 less than that of thermocouple element 50, as illustrated in FIGS. 2 and 3 so that thermocouple element 50 is exposed and not covered or otherwise hidden by element support means 70. When probe 10 is pressed against the surface whose temperature is to be measured, deformation of thermocouple element 50 is limited by element support means 70, reducing the wear and chances of breakage of thermocouple element 50, and also ensuring a desirable contact between thermocouple element 50 and the surface whose temperature is to be measured Referring particularly to FIGS. 1-4, thermocouple element support means 70 preferably comprises two rigid caps, 70a and 70b, removably mounted on housing means 30 to cover housing means 30, leaving only thermocouple element 50 exposed. Caps 70a and 70b are preferred so as to protect the contact between thermocouple element 50 and the surface whose temperature is to be measured from the influence of environmental air and also to cover the internal areas of housing means 30.

Figure 5:
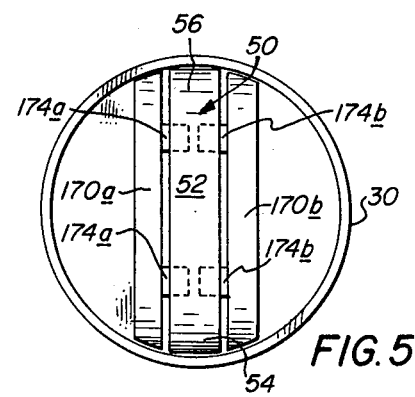
FIG. 5 is a top plan view of an alternate embodiment of the present invention showing the upper surface of the thermocouple probe.

Preferably, the contact surface of thermocouple element 50 is provided with a slippery, electrically insulated layer, most preferably of polytetrafluoroethylene, as taught by U.S. Pat. No. 4,279,154 to Nakamura, the disclosure of which is incorporated herein by reference. Such layer decreases the wear on thermocouple element 50 when contacted with a moving surface and also permits an ungrounded junction between thermocouple element 50 and the surface whose temperature is to be measured to eliminate the deleterious effects of extraneous voltage from the surface and between the surface and thermocouple element 50. Furthermore, thermocouple element 50 may have a backing or overlayer of suitable materials, such as glass, mica, a ceramic material, or a plastic, especially a high temperature plastic such as KYNAR plastic, commercially available from Penwalt Associates, which serve to prevent reductions in response time In an alternate embodiment, illustrated in FIGS. 5 and 6, element support means 170 may comprise two strips of a rigid material, 170a and 170b, removably mounted on either side of thermocouple element 50, with supporting braces, 174a and 174b, extending from strips 170a and 170b to thermocouple element 50 to limit the deformation of thermocouple element 50. Braces 174a and 174b are typically individual elements extending only partially below thermocouple element 50. Braces 174a and 174b can also comprise single unitary elements extending entirely from strip 170a to strip 170b below thermocouple element 50.

In using thermocouple probe 10 of this invention, thermocouple probe 10 is contacted with the surface whose temperature is to be measured such that thermocouple element 50, especially junction 52, is in contact with the surface. Preferably, pressure is applied so that thermocouple element 50 is pressed against the surface, ensuring adequate contact between junction 52 and the surface. The temperature at the surface is then measured by a suitable device interpreting the current flowing from junction 52 through leads 60a and 60b.

Replacement of thermocouple element 50 is preferably effected by removing element support means 70 from housing means 30 and then unsecuring securing means 40, preferably by unscrewing screws 40a and 40b, and removing the worn or broken thermocouple element 50. A new thermocouple element may then be set into housing means 30 and secured with securing means 40, preferably by replacing screws 40a and 40b. Element support means 70, if used, may then be remounted on housing means 30.

While a preferred embodiment of the present invention has been described above and illustrated in the accompanying drawings, it is understood that other embodiments are within the contemplation of the inventors and their invention is not limited to the embodiments shown.

We claim:

1. A thermocouple probe having a replaceable thermocouple element, the probe comprising:
    (a) a cylindrical body having a housing means at one end;
    (b) a securing means associated with said housing means comprising two securing elements in electrical isolation from each other; and
    (c) a resilient thermocouple element comprising an arcuate strip of two dissimilar metals joined together, the ends of said thermocouple element being removably secured to said securing means.

2. The probe of claim 1 wherein said thermocouple element is about 0.003 to about 0.020 inches thick.

3. The probe of claim 2 wherein said thermocouple element is about 0.005 to about 0.010 inches thick.

4. The probe of claim 2 which further comprises two leads connected to said securing means in electrical contact with the ends of said thermocouple element, said leads extending through said cylindrical body and exiting through a port in said cylindrical body.

5. The probe of claim 4 which further comprises an element support means mounted on said housing means to limit deformation of said thermocouple element.

6. The probe of claim 5 wherein said support means comprises two support elements, one mounted on each side of said thermocouple element.

7. The probe of claim 6 wherein said support means comprises a cap for covering said housing means, leaving said thermocouple element exposed.

8. The probe of claim 7 wherein the height of said support means from said housing means is less than the height of said thermocouple element from said housing means.

9. The probe of claim 2 wherein said thermocouple element is comprised of metals selected from the group consisting of iron, copper, nickel, aluminum, chromium and alloys thereof.

10. The probe of claim 1 wherein each of said securing elements comprises a screw which fits into a corresponding screw-hole integrally associated with said housing means and wherein each of the ends of said thermocouple element are adapted to be secured to said housing means by one of said screws.

11. The probe of claim 1 wherein the ends of said thermocouple element are polarized to assure proper securing to said securing means.

12. The probe of claim 11 wherein said securing elements are polarized to assure that the proper end of said thermocouple element is secured thereto.

13. A thermocouple probe having a replaceable thermocouple element, the probe comprising:
(a) a cylindrical body having a housing means a one end and a port at the other end;
(b) a securing means associated with said housing means comprising two securing elements in electrical isolation from each other;
(c) a resilient thermocouple element about 0.003 to about 0.020 inches thick comprising an arcuate strip of two dissimilar metals welded together, the ends of said thermocouple element being removably secured to said securing means;
(d) a pair of leads, each of which is secured to one of said securing elements so as to be in electrical contact with one end of said thermocouple element, said leads extending through said cylindrical body and exiting through said port; and
(e) an element support means mounted on said housing means to limit deformation of said thermocouple element.

14. The probe of claim 13 wherein said thermocouple element is about 0.005 to about 0.010 inches thick.

15. The probe of claim 13 wherein said housing means is integrally formed on said cylindrical body.

16. The probe of claim 13 wherein said element support means comprises a support element mounted on each side of said thermocouple element.

17. The probe of claim 13 wherein said thermocouple element support means comprises a cap for covering said housing means, leaving only said thermocouple element exposed.

18. The probe of claim 13 wherein said thermocouple element is comprised of metals selected from the group consisting of nickel, iron, copper, aluminum, chromium and alloys thereof.

19. A resilient, removably securable thermocouple element comprising an arcuate strip having two ends, said strip comprised of two dissimilar metals welded together, the improvement comprising the ends of said thermocouple element being adapted to be removably secured to a securing means.

20. The thermocouple element of claim 19 which comprises metals selected from the group consisting of copper, nickel, iron, aluminum, chromium and alloys thereof.

21. The thermocouple element of claim 20 which is about 0.003 to about 0.020 inches thick.

22. The thermocouple of claim 21 which is about 0.005 to about 0.010 inches thick.

23. The thermocouple element of claim 19 wherein said ends of said thermocouple element are adapted to be secured to said securing means by means of two securing elements each comprising a screw and a corresponding threaded member.

24. The thermocouple element of claim 23 wherein the ends of said thermocouple element are adapted to be removably secured to said securing means by forming a slot for receiving and engaging a screw in each of the ends.

25. The thermocouple element of claim 24 wherein the ends of said thermocouple element are polarized to assure proper securing to said securing means.

* * * * *